United States Patent
Baresich et al.

(10) Patent No.: US 7,279,122 B2
(45) Date of Patent: Oct. 9, 2007

(54) MOLD AND PROCESS FOR MAKING A VERY THIN WALL ARTICLE

(75) Inventors: Frank J. Baresich, Centerville, GA (US); Robert F. Thompson, Kennebunk, ME (US)

(73) Assignee: Thermal Wave Molding Corporation, Aventura, FL (US)

( * ) Notice: Subject to any disclaimer, the term of this patent is extended or adjusted under 35 U.S.C. 154(b) by 51 days.

(21) Appl. No.: 10/550,174

(22) PCT Filed: Mar. 31, 2004

(86) PCT No.: PCT/US2004/009921

§ 371 (c)(1),
(2), (4) Date: Sep. 21, 2005

(87) PCT Pub. No.: WO2004/089597

PCT Pub. Date: Oct. 21, 2004

(65) Prior Publication Data

US 2006/0170125 A1   Aug. 3, 2006

Related U.S. Application Data

(60) Provisional application No. 60/459,104, filed on Mar. 31, 2003.

(51) Int. Cl.
B29C 45/73 (2006.01)

(52) U.S. Cl. .................. 264/40.6; 264/328.16
(58) Field of Classification Search .............. 264/40.6, 264/327, 328.16; 249/111, 134; 425/144, 425/407, 552
See application file for complete search history.

(56) References Cited

U.S. PATENT DOCUMENTS 6,276,656 B1 * 8/2001 Baresich ................. 425/547
6,290,882 B1 * 9/2001 Maus et al. ............. 425/548

* cited by examiner

Primary Examiner—Jill L. Heitbrink
(74) Attorney, Agent, or Firm—Duane Morris LLP

(57) ABSTRACT

An injection mold and process are arranged to produce very thin articles, such as data discs. Molten plastic is injected into mold parts forming a thin cavity (17), in a cyclic molding process wherein the mold parts are subjected to a substantially constant temperature stimulus and rise and fall in temperature during injection and cooling of the molten plastic. Temperature boosting thermal insulation layers (11, 21) are placed along at least certain parts of the molding cavity surface. This elevates the temperature of the molted melt material for a time during injection. According to a calculated relationship, this thermal insulation is sized to permit the thin mold cavity to fill before heat transfer to the mold parts solidifies the molding material and blocks further flow. The temperature boosters can be contoured in thickness.

8 Claims, 5 Drawing Sheets

MOLD AND PROCESS FOR MAKING A VERY THIN WALL ARTICLE

CROSS REFERENCE TO RELATED APPLICATION

This application claims the priority of U.S. provisional patent application Ser. No. 60/459,104, filed Mar. 31, 2003.

BACKGROUND OF THE INVENTION

This invention relates generally to the field of plastic molding. A mold and process for manufacturing are provided for producing an article having a molded wall that is very thin. In connection with the invention, a "very thin" wall can be construed either to have a material thickness of 0.4 mm or less; or to have a ratio of molding material flow path length to thickness of 150 or more.

The relative thickness versus elongation of an article to be injection molded using heated plastic resins or the like, can cause molding challenges and design constraints. Tradeoffs that are made in molding very thin wall articles can affect the strength of the molded parts, their surface quality, cost, the speed at which they can be produced, the energy requirements for temperature control and other factors.

Some of the problems and choices that are encountered concern arrangements by which heat energy is transferred from the heated molding material into the mold cavity. The molding material is introduced into the molding cavity at high temperature and low viscosity, by force of injection pressure, so as to flow and fill the mold cavity. After the mold has been filled, cooling of the molding material to a temperature below a solidification temperature causes the molding material to set in the shape of the molding cavity. The cooling occurs by heat transfer from the molding material to the molding cavity. It is undesirable for this process to take any longer than absolutely necessary. Therefore, the molding material temperature at the time of injection and the temperature and thermal inertia of the molding cavity are determined, often by trial and error, so that the molded part is cooled and sufficiently solid to be removed from the mold, relatively promptly after the mold has been completely filled.

If the molded part is thin, the flow path of the injected material is relatively long and narrow. If the mold cavity then is kept at a temperature below the solidification temperature of the material, there is a tendency for the molding material flowing along the thin flow path to solidify, between the point of injection and the most distant part of the mold cavity. The cavity does not fill before setting material blocks the flow path. Various material and design changes might help with this situation, but have drawbacks. For example, if the mold cavity is kept at a higher temperature during filling, it takes a long time for the molded part to set. Temperature cycling arrangements require controls. If the material composition is arranged to have a particularly low viscosity, the surface or strength qualities of the part may be less than adequate. A very high injection pressure can be used to fill the mold very quickly, but that causes other design and operational problems. Some of the tradeoffs that are of concern are discussed in the publication "Elimination of Process Constraints in Plastics Injection Molding," Abbott, et al., Dept. of Plastics Engineering, U. Mass. Lowell.

Due to these issues, thin wall parts are molded at high melt temperature, very high injection pressure, and high injection rates. For example, typical conditions for injection molding a DVD disc, which is 0.6 mm thick, include: 380° C. melt, 17,000 to 20,000 psi maximum injection pressure, and 0.11 S. fill time. U.S. Pat. No. 6,325,950—Hosokawa, et al. teaches an injection rate of at least 65 cubic centimeters per second for DVD molding.

DVD and other optical data disks can have a considerable ratio of molding material flow path length to thickness, for example approximately a factor of 100. An injection "coining" process can be used for optical disc molding by commencing molding with a low starting clamp force, such as only one or two tons. Under appropriate conditions, a low clamp force may allow the injection pressure to force the cavity surfaces further apart temporarily increasing the thickness of the melt flow path by 15 to 30 percent. After melt injection is approximately complete, the clamp force is increased. The added clamp force squeezes the melt to fill out the cavity and returns the cavity thickness to the desired final disc thickness. One brand of machine for DVD molding provides maximum injection pressure options of 25,000 or 30,000 psi with 30 metric tons of clamp capacity. A different machine for other types of thin wall parts provides injection pressure of 47,000 psi.

If the thickness of the optical disc is to be reduced, for example to 0.25 mm and the volumetric fill rate is reduced by a comparable factor relative to a nominal rate to fill a DVD cavity of 0.6 mm in the same time period, the required injection pressure needs to be increased by a factor of 5.76, approximately. At that factor, the injection pressure could need to increase to 100,000 to 115,000 psi, which is beyond the capacity of typical optical disc and thin wall molding machines.

U.S. Pat. No. 6,440,516—Yamasaki, et al., for optical discs, states that injection molding cannot produce a disc substrate less than 0.3 mm thick. It further asserts if pits and grooves are to be molded into the surface of a disc; the disc cannot be less than 0.5 mm thick. In fact it has not been practical or possible to date to dependably mold the approximately 0.3 mm thick middle layer disc to the required quality needed for DVD-14 and DVD-18 described by U.S. Pat. No. 6,177,168—Stevens, despite the substantial economic benefit that might be derived. The current process, which is expensive, molds an 0.6 millimeter thick transfer disc; applies a reflective coating to the transfer disc; bonds it to a semi-reflective coated polycarbonate disc; and then strips the transfer disc away from its reflective coating and discards the transfer disc. This leaves a semi-reflective and reflective coating separated by a controlled thickness of adhesive on the polycarbonate disc.

The ratio of flow path length to thickness for a 0.25 mm thick disc is approximately 240. This thickness is a very thin wall article in accordance with the present subject matter. It would be advantageous to develop a practical and dependable way to produce high quality molded discs at this extreme thinness.

When injecting hot plastic melt, cooler mold cavity surfaces rapidly carry away heat energy, causing the plastic to solidify at the spaced walls of the cavity while the melt flows into the cavity between the solidified plastic at the cavity walls. In other words, the melt develops frozen surface layers against opposite walls bounding the flow path, reducing the thickness of the flow channel for the melt to a thickness that is less than the space between the opposite walls.

The rate of cooling is proportional to the cavity surface area (and other parameters such as the temperature difference). The amount of heat energy in the melt is proportional to the cavity volume. A very thin wall article has a high ratio of surface area per unit of volume. Therefore, cooling of the melt can be rapid in very thin wall articles. As the flow channel for the melt is reduced to a fraction of the wall thickness by solidified melt material on the cavity walls, the melt flow path becomes thinner and the blockage becomes more prominent. For the 0.6 mm thick DVD optical disc, if a frozen layer on each opposite cavity wall builds to 0.09 mm, the injection flow path thickness is decreased 30 percent to 0.42 millimeters. The flow path thickness for the 0.25 thick disc example described above would also be reduced 0.09 mm a side, a reduction of 72 percent to 0.07 mm. If the phenomenon is addressed by increasing the injection pressure, the required injection pressure to fill the mold would be impractical or unattainable using existing equipment.

U.S. Pat. No. 6,440,516—Yamasaki et al. and U.S. Pat. No. 6,512,735—Takeda et al. conclude that a 0.1 millimeter optical surface layer disc, for information capacities over 15 GB, cannot be molded. Because of this limitation, Yamasaki '516 describes using a pressure sensitive adhesive film or a dry photopolymer film for the surface layer. Such films do not pass climate tests, are not cost effective due to material costs, and may require trimming the film after attachment, which adds a step and a work station to the process. Yamasaki '516 describes a spin coated ultraviolet cured layer. Spin coating a layer with satisfactory properties and geometric tolerance has proven extremely difficult and is not currently done.

U.S. Pat. Nos. 6,276,656 and 6,019,930, both to the present co-inventor, F. Baresich, teach techniques to optimize molding processes by reducing the total molding cycle time. These patents are not concerned with maintaining a material flow path for a very thin molded part, instead concerning techniques to minimize molding cycle time without regard to cavity dimensions. Remarkably, the cycle time is decreased by retarding the rate at which heat energy passes from the molten material into the thermal mass defining the mold cavity, using temperature boosting insulators, which one would not expect to shorten overall molding cycle time. However, the patents demonstrate that in connection with other factors including the ability to begin with the cavity at a much lower pre-injection temperature than would otherwise be necessary without the temperature boosters, the cycle time can be shortened.

The present invention is concerned with the ability to make very thin wall parts. It should be apparent from the foregoing discussion that a very thin injection molded data disc would be advantageous. It is also plain that the present technologies for making very thin parts are struggling with problems of flow restriction and pressure. Insofar as the thermal mass of the cavity is employed to receive and remove heat energy from the melt, and the melt needs to flow past cavity surfaces to fill the entire cavity, there is an inherent problem that prevents unlimited decrease in the thickness of molded parts.

Thin wall parts such as syringes have to be filled quickly, but are limited in wall thickness due to the injection pressure required to fill the long core causing some deflection of the core pins and subsequent variations in wall thickness. Running higher mold temperatures can reduce this affect but at a tradeoff to cycle time.

Jewel case for example, once they were being made in China, many manufacturers began to reduce wall thickness to save weight and cost. However, the increased need for injection speed to fill the cavity also caused stress in the hinges that caused many to break upon opening. A thinner wall section without flow induced stress and without added cycle time would be desirable. Jewel cases are made from polystyrene and the mold temperatures are generally set for below 20C.

SUMMARY OF THE INVENTION

It is an object of the invention to provide a mold and process for molding articles that have a very thin material thickness (a very thin wall), and to overcome problems that have prevented the prior art from reducing wall thicknesses as outlined above. More particularly, the invention provides practical techniques to mold a wall that is no more than 0.4 millimeters thick and/or has a molding ratio of flow length to wall thickness of 150 or more.

Another object of the invention is to provide a mold and process to facilitate injection-compression molding very thin wall articles.

Another object of the invention is to provide a mold and process for molding very thin wall articles wherein the heat energy transfer from the molten material to the mold cavity is controlled using cooperation with thermal insulation techniques for boosting the process temperature of the cavity surfaces that are brought into contact with the melt. In particular, thermal insulation structures, or temperature boosters, are placed and configured to maintain a higher surface temperature during mold filling, so as to reduce freezing of melt on cavity walls that define a flow path for the melt into the cavity. The temperature boosting insulators reduce the rate at which surface freezing occurs to constrict the dimensions of the melt flow path, and/or keeps the melt material at a low viscosity for a long enough time for the mold to fill completely.

Another object is to provide a mold and process for molding 0.07 to 0.12 millimeter thick discs suitable for use as an optical surface layer for high density DVD writeable and rewritable discs useful, for example, for high definition TV video and other high data density applications.

A further object of the invention is to provide a mold and process for molding approximately 0.1 millimeter thick discs that produces sufficient surface quality to form effective molded pits or groove tracks suitable for use as high definition TV DVD data carrier substrates.

Another object of the invention is to provide a mold and process for molding 0.4 millimeter or less thick discs with surface pits or groove tracks suitable for use as a middle layer for DVD-14 and DVD-18 discs.

An object of the invention is to provide a mold defining a mold cavity and a process to fill the mold cavity, for a very thin walled article, by relying on temperature control aspects to extend the time that the mold cavity remains unobstructed to as to permit further flow of the melt. According to another aspect, however, the mold and process for manufacture of a very thin disc can include use of a thickened center portion. The thickened center portion facilitates starting the molten material flowing into the cavity due to the increased flow path thickness in that area. Therefore, the injection pressure required to fill the center portion of the disc is less than when the center portion is thinner.

Another object of the invention is generally to accomplish mold coining at lower injection pressures than known heretofore. Coining techniques involve injecting the melt at an injection pressure sufficient to separate the mold halves against clamping forces, thus increasing the width of the flow path temporarily during injection. Coining is known for optical disc and lens molding, but in conjunction with other aspects of the invention, including temperature boosting insulators at selected points along the flow path, facilitates molding at low wall thicknesses. A recessed center portion in the disc cavity can present more surface area at lower injection pressure to assist in the coining aspect, thereby reducing the level of injection pressure required to overcome the mold clamping force during coining. When the required volume of molten material is in the cavity, the clamp pressure is increased rapidly to compress the mold and finally shape the molded article. The recessed portion of the mold can be advanced to obtain substantially constant wall thickness throughout the disc Other objects and advantages of the present invention will become apparent from the following descriptions, taken in connection with the accompanying drawings, wherein, by way of illustration and example, particular embodiments of the invention are disclosed.

BRIEF DESCRIPTION OF THE DRAWINGS

The drawings constitute a part of this specification and include exemplary embodiments to the invention, which may be embodied in various forms. It is to be understood that in some instances various aspects of invention may be shown exaggerated or enlarged to facilitate an understanding of the invention.

DETAILED DESCRIPTION OF THE PREFERRED EMBODIMENTS

Figure 1:
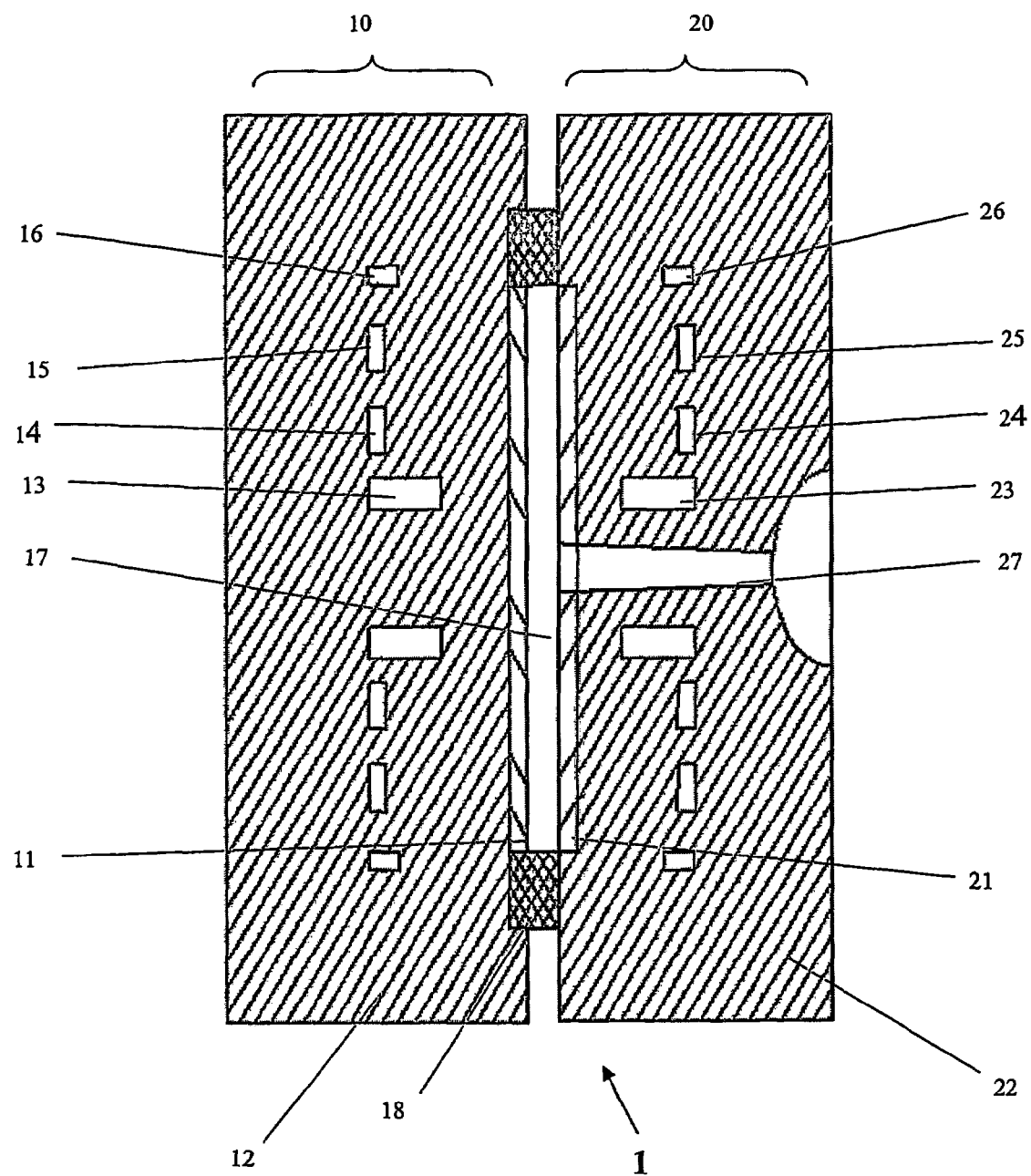
FIG. 1 is a cross-section of a mold according to the first embodiment of the invention.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

According to the present invention, molded articles can be produced with very thin walls that are not economically producible by other molds and processes due to the usual occurrence of setting or freezing of product melt along mold cavity surfaces. As the mold is filled with melt, the mold cavity forms a flow path through which the melt needs to flow in order to fill the mold cavity. A finite time period elapses as the mold fills. Therefore, solidification can occurs along the flow path nearer to the point of injection as the melt flows beyond that point to fill more remote parts of the mold cavity. One aspect of the inventive technique is to provide thermal insulation along the mold cavity surfaces to keep the temperature higher along the flow path between the point of injection and such remote parts of the cavity. However, it is also necessary and desirable to cool and set the melt in the cavity once the melt has been fully injected. Therefore, the thermal insulation, also described herein as temperature boosters, are configured according to a technique wherein the respective temperatures, thermal conductivity and timing are related according to a function that optimizes the molding operation.

The invention is useful alone as well as together with diverse molding techniques by which one can better obtain a less obstructed or larger flow path for melt during the mold filling stages, such techniques including injection compression and coining, for example, that effectively inflate the mold against clamping pressure during filling stages.

The invention provides a process and mold to optimally cycle cavity surface temperatures, while reducing or eliminating reliance on potentially expensive and complicated equipment and controls. The invention permits molding of thin walled articles using robust melt compositions as opposed to compositions that are chosen for low viscosity during molding, which might have drawbacks in terms of strength or surface quality.

While the mold is filling, dies with temperature boosters at the cavity surfaces cause heat flowing from the molten material to the temperature boosters to bring the cavity surfaces to at least a sufficient temperature to retard the rate at which the material freezes on the surfaces and obstructs the flow path, i.e., maintaining the temperature to at least the temperature required to completely fill the mold before the flow path becomes obstructed. The temperature preferably is elevated slightly above this minimum to accommodate process variations, but is preferably kept only just high enough so as to also minimize mold cycling time.

Dies with temperature boosters of a thickness as provided herein elevate cavity surface temperatures and maintain such elevated temperatures for a sufficient time that the viscosity of the molten material remains low enough that the mold is fully filled before the stiffening melt material blocks flow. As further heat energy flows from the melt into the mold cavity material, the molded article is stiffened sufficiently for removal. The inventive temperature boosters are arranged to maintain the elevated temperature even though the quantity of flowing molten material in the thin cavity, and the heat available from the thin body of melt material is relatively insubstantial as compared to thicker molded articles.

The mold and the process employed according to the invention can accelerate cooling of the molten material into a molded article, but in order to make a very thin-walled article, it is important to control the cooling, not merely to accelerate cooling, so that the cooling of portions of the flow path that function as flow paths leading from a point of injection to remote other points, do not set and obstruct the flow path until the mold is full.

A mold structure is first provided, containing a plurality of mold parts that can be brought together to form a mold cavity in the shape of the article to be molded. The mold parts comprise dies of which at least one includes at least one thermal insulation structure. The thermal insulation structure serves to maintain an elevated temperature as compared to a comparable die in which the material of the die was a homogeneous thermal conductor. As a result, the insulation functions as a temperature booster. The temperature booster (or plural boosters) are mounted adjacent to and in thermal communication with the die (or plural dies). The dies provide structural support for the boosters.

The temperature boosters or insulators can form at least a part of the surfaces of the mold cavity, but in any event are disposed along a thermal communication path between the cavity and the thermal sink defined by the mold parts. Furthermore, the boosters are specifically made of materials whose mathematical products of thermal conductivity, density, and specific heat, the product of which is a measure of a rate of thermal transfer which are no more than $2.0 \times 10^{-6}$ $BTU^2/sec/in^4/°F.^2$ at room temperature.

Preferably, the boosters or other coupled surface arranged for contact with the molding material in the mold cavity have a robustness and surface finishing characteristics suitable for production. The thickness of the temperature boosters is chosen specifically to obtain cavity temperatures that are elevated at portions of the mold cavity affected by the temperature boosters. The booster thickness is such that during mold filling stages, an area of the mold cavity that serves as a flow passageway for distributing molten molded material adjacent to the booster retains a temperature effective to keep the viscosity of the molten material low enough to flow readily. In this way, the temperature booster thickness is sufficient at thin points in the cross section of the mold cavity to retain a sufficient temperature to prevent obstruction, thus completely filling the mold for even a molded article that is very thin. This result is obtained according to the invention by providing a booster thickness according to the following equations $$(T-T_s)/(Tm-T_s) = erfc(X)$$

$$X = Z/(2*(\alpha*t)^{(1/2)})$$

According to these equations, $T-T_s$ is the amount of temperature increase to allow at the die side of booster layer. A range of 0.1 to 5 degrees C. is recommended and 0.1 degree C. preferred. $T_s$ is the temperature at the cavity surface side of the booster before contact by the hot melt. Tm is the desired cavity surface temperature during filling. A range of solidifying temperature plus 10 degrees C. to the melting point temperature is recommended and the melting point temperature is preferred for amorphous materials. $\alpha$ is the thermal diffusivity of the booster layer material. The thermal diffusivity of a material is the thermal conductivity of the material divided by its density and specific heat. Variable "t" is the time to fill the cavity. Z is the thickness of the booster layer. Variable "erfc" is a complementary error function. Tables of erfc that provide the value for X associated with the number from the left side of the equation are available on the internet and the literature. See, for example, http://mathworld.wolfram.com/Erfc.html.

According to the invention, means for applying temperature control stimuli to the die are provided so as to apply a substantially constant temperature control stimuli to the mold die via thermal control means. During mold cycling the temperature of the mold varies as the hot melt is injected, raising the die temperature, then the die cools to a temperature at which the molded product is set. However, it is an aspect of the invention that one can avoid the need for a control that tracks a temperature-time profile, instead relying on the variation in temperature that is achieved using a die that may be subjected to a constant thermal stimulus, i.e., a control that seeks a particular average temperature.

The thermal stimulus brings the cavity surfaces of the mold to predetermined temperatures that initially are below the heat deflection temperature of the plastic. Upon contact with the hot molten material, the temperature of the cavity surface increases to an elevated temperature, preferably at least 10 degrees C. above the solidifying temperature of the molding material. In this way, the viscosity of the molten material is relatively low. According to an inventive aspect, the temperature is kept high enough by the thermally insulating temperature boosters that the molten material remains low enough in viscosity to flow during the mold filling phase of injection. The mold is completely filled for a very thin wall article.

The mold halves can be displaced during filling so that the cavity opening in the thickness direction is 2 to 10 times the desired thickness of the article to be molded. This displacement can be a matter of forcing the mold parts apart by employing an injection pressure that briefly overcomes clamping pressure holding the mold parts closed. Alternatively, a mechanical arrangement can spaced the mold parts by more than the desired final thickness of the part, and with application of clamping pressure after filling the mold, the molded part is coined or compressed in the thickness direction to obtain the necessary final dimensions.

In a preferred arrangement, the full shot of hot melt is injected into the cavity while held or permitted to expand to such excess thickness, the injection being completed as fast as possible. The injection speed can be determined by using a relatively high injection pressure, multiple injection ports and other techniques. The introduction of the hot melt heats the cavity surfaces associated with the thermally insulating temperature boosters. The injection temperature of the melt is set to a sufficiently high temperature that the surfaces of the mold cavity increase from the predetermined pre-injection temperature to temperatures at or above the temperatures required to completely fill the very thin wall article mold.

Immediately after injection is complete, or preferably slightly before injection is complete, a high clamp force is applied for squeezing the melt to fill out the cavity and obtain the desired article thickness. During this phase, the melt continues to convey heat energy into the cavity surfaces and preferably the temperature of the cavity surfaces at the temperature boosters is still increasing.

However, after the cavity is substantially full and the dimensions of the cavity return to nominal under clamping pressure (i.e., the mold halves are clamped until they come into abutment at surfaces the are not spaced by melt material), the mold cavity surfaces cool to a temperature at which the melt material sets. According to the invention, however, the thermally insulating temperature boosters have retarded such cooling at least at areas of the mold cavity where the desired product dimensions are very thin. The temperature boosters control the rate at which heat flowing from the cavity, through the booster to the relatively colder temperature-controlled dies. The molded article is stiffened for removal. This preferably occurs as promptly as practicable as taught by Baresich patents 6,276,656 and 6,019,930. Moreover, according to an inventive aspect the cooling timing is controlled to prevent the local setting of melt material at thin points in the mold cavity where such obstruction would otherwise prevent flow of melt material through such thin points as needed to accomplish filling of the mold. This can be accomplished by using temperature boosters that are of a uniform sufficient thickness, or according to another aspect of the invention, the boosters are made with variations in thickness so as to optimize temperature uniformity at the cavity surface.

In accordance with a preferred embodiment of the invention, there is disclosed in FIG. 1 a simplified cross-section of a first embodiment mold 1 for manufacturing a very thin wall optical disc. This embodiment is discussed in connection with a moving mold part 10 and an opposed mold part 20, it being understood that such movement is a relative matter and either or both of the mold parts can be movable. The disclosed embodiment is more or less symmetrical across the cavity, each side having thermally insulating temperature boosters and temperature control fluid passages. It should also be understood that the preferred symmetrical arrangement is only an example and it is also possible to embody the invention asymmetrically, e.g., with temperature boosters on one side only.

In the embodiment of FIG. 1, a relatively movable side element 10 of mold 1 comprises moving side temperature booster 11, moving side die 12, center fluid passages 13, 14, and 15, and edge fluid passages 16. Passages 13, 14, and 15 are interconnected or connected with outside passages (not shown) to form a circuit for carrying temperature control fluid. According to an aspect of the invention, however, passage 16 can be part of a distinct and separate circuit that is used to circulate heat transfer fluid that is hotter than the fluid circulating in the center passages. This advantageously allows a local variation in temperature and heat energy movement, especially to provide additional heat at the outer edge of the die where heat loss is greater. Such variations can also be employed in zones where the die cavity is particularly thin where the cavity forms a passage for melt material flowing to fill the mold. The use of a flowing coolant is also an example only. Other known thermal means for temperature control stimuli may be used, such as resistive heaters, and such heaters can likewise be arranged to provide for an uneven application of heat energy for the reasons mentioned herein.

In the embodiment shown, boosters 11 define at least a part of the surfaces of cavity 17. Accordingly, boosters 11 are made from a material that has the required durability to not only withstand normal operating chemical exposure, temperatures and pressures, but also the occasional process malfunctions where a sprue or molded part inadvertently is crushed in the mold. As an alternative, boosters 11 could be mounted between a durable lining material and the body of the associated mold half, but according to an inventive aspect, the boosters comprises a particularly durable material, namely zirconium, and are used to line the mold cavity.

Mold lining surface layers that can elevate cavity surface temperature are offered by Thermo CeramiX and disclosed in U.S. Pat. Nos. 5,041,247, 5,064,597, 5,176,839. Although such materials are possible, considerations of differences in thermal expansion and permanent material deformation under localized load (e.g., crushing), are such that these materials and other similar materials may not have the durability needed to survive rapid temperature cycling and sprue or molded part crushing damage.

The booster material has a mathematical product (kρc) of thermal conductivity (k), density (ρ), and specific heat (c) no more than $2.0 \times 10^{-6}$ $BTU^2/sec/in^4/°F.^2$ at room temperature, and preferably no more than $1.6 \times 10^{-6}$ $BTU^2/sec/in^4/°F.^2$. This is much less than corresponding kρc products for the common mold metals. For example, the corresponding kρc product is about $9.2 \times 10^{-6}$ $BTU^2/sec/in^4/°F.^2$ for 420 stainless steel.

Depending upon the specific requirements for cavity surface characteristics such as smoothness, hardness, stiffness, scratch resistance, chip resistance, chemical resistance, etc., inorganic materials such as borosilicate glass, quartz, glass ceramic, titanium, zirconia, and sapphire are examples of materials that can be used as surface temperature boosters. The inventors have found zirconia to be particularly desirable due to its low coefficient of friction, very good release properties, hardness, scratch resistance, suitability for polishing, coefficient of thermal expansion close to the coefficients for metal and low wear.

A purpose of booster 11 is to cause the temperature of the cavity surface to cycle so the surface is sufficiently hot to enable complete filling of the cavity and shaping of the molten material while the cavity is being filled. Advantageously, this means that the cavity surface temperature is increased to at least 10 degrees C. above the solidifying temperature of an amorphous polymer used as the molding material or melt, and preferably to or above the melting point of the polymer.

The melting point of a typical polymer for use in molding of high density data discs is 1.33 to 2.0 times the glass transition temperature of most plastics. The melting point is generally the point where the melt enters a fully flowable state from a viscoelastic state at nearer to the glass transition temperature. For DVD polycarbonate the approximate glass transition and melting point temperatures are 143 degrees C. and 210 degrees C. respectively. For amorphous polymers such as polycarbonate melt viscosity decreases as the temperature increases and as the shear rate during flow increases. The viscosity when polycarbonate is not flowing and the temperature is 155 degrees C., is about fifty percent of the viscosity at 145 degrees C., at 160 degrees C. it is about twenty percent, and at 210 degrees C. it is only about one-half of one percent of the viscosity at 145 degrees C. In contrast, crystalline materials can go from solid to melt within a short temperature span, sometimes within a few degrees. Typical applications involving materials such as polypropylene and polyethylene will be melted and then injected into a cold "chilled mold" for cooling. A thinner wall section without flow induced stress and without added cycle time are some of the benefits from this invention when using crystalline materials.

Shear heating during melt flow also reduces the material viscosity. The reduction in viscosity is greater as the shear rate increases. According to the invention, cavity surface temperatures are elevated above the solidifying temperature at least long enough to ensure the mold fills completely, after which heat transfer from the boosters to the relatively colder dies cools the cavity and sets its contents. To accomplish this, the thickness of the booster is determined from the following equations:

$$(T-T_s)/(Tm-T_s)=erfc(X)$$

$$X=Z/(2*(\alpha*t)^{(1/2)})$$

Where:

$T-T_s$ is the amount of temperature increase to allow at the die side of booster layer. A range of 0.1 to 5 degrees C. is recommended and 0.1 degree C. preferred.

$T_s$ is the temperature at the cavity surface side of the booster before contact by hot melt.

Tm is the desired cavity surface temperature during filling. A range of solidifying temperature plus 10 degrees C. to 100 degrees C. is recommended and the melting point temperature is preferred for amorphous materials.

α Is the thermal diffusivity of the booster layer material t is the time to fill the cavity Z is the thickness of the booster layer erfc is a complementary error function. Tables of erfc that provide the value for X associated with the number from the left side of the equation are available on the internet and the literature.

The booster thickness may be greater than obtained from the above equation for manufacturing purposes such as increased stiffness to minimize local deflections at void locations in material used to bond the booster 11 to the die 12 when injection and compression pressures are applied. However, thicker booster layers can increase cooling and cycle time.

Because while the mold is filling, heat flowing from the molten material increases the temperature of the booster cavity surfaces so much, the initial temperature of die 12 can be below the heat deflection temperature of the plastic being molded. For example, the inventors have found by analysis of one design of this first embodiment that when the temperature of cavity surfaces just prior to contact by molten polycarbonate is 100 degrees C. the boosters elevate the cavity surfaces to over 165 degree C. for approximately 0.040 second and remains above the 143 degrees C. glass transition temperature for 0.12 second or more, which is longer than needed to completely fill the cavity.

The boosters can be shaped by machining, molding, grinding, etc. to provide for thermal insulation effects that vary across a surface due to variations in booster thickness. The boosters can be mounted to the dies using bolts, adhesive bonds, solder bonds, brazing, vacuum, clamps, etc. Alternatively, booster material can be attached in such manners and then shaped when forming the contour of the mold cavity, e.g., by machining, grinding, etc.

In the embodiment shown, moving-side die 12 provides structural support to boosters 11. Die 12 can be made from various materials that have high thermal conductivity, e.g., common mold metals, and thermal coefficient of expansion properties compatible with booster materials so that differences in expansion cannot damage boosters 11 or their means of attachment during temperature cycling. When zirconia is used for booster 11, 420 stainless steel is a good choice for die 12 because of the close match of thermal expansion rates.

To achieve more uniform temperature at the cavity surface when molding articles such as optical discs, fluid passages preferably are carefully spaced and shaped to control the amount of die material between heat transfer surfaces of the passages and the cavity surfaces at all locations. FIG. 1 illustrates passage spacing and shapes appropriate for molding very thin wall optical discs. The spacing and shapes were arrived at by Finite Element Analysis; and testing has shown this approach extremely effective for DVD molds.

FIG. 1 also shows a stationary-side element 20. Element 20 comprises stationary-side temperature boosters 21, and stationary-side die 22. Boosters 21 define at least a part of the surfaces of a mold cavity 17. Stationary-side temperature boosters 21 in this embodiment have comparable structures, serve the same purposes and have the same requirements as moving-side temperature boosters 11. Thus the boosters and other structures can be made of the same materials on both sides. Likewise they can also differ. The stationary side elements can be installed in any of the ways already described for boosters 11 on moving-side die 12.

Center fluid passages 23, 24, and 25 are interconnected to form a circuit. Passage 26 is a separate circuit used to circulate heat transfer fluid that is hotter than the fluid circulating in the center passages to provide additional heat at the outer edge of the die where heat loss is greater. Other known thermal means for temperature control stimuli may be used.

An entrance 27 provides a way for the molten material to enter mold cavity 17. Other means for introducing molten material into the mold cavity may be used.

The mold 1 is applicable to molding various very thin walled articles but is particularly useful for molding optical discs such as surface layers for High Definition DVD discs that are intended to be approximately 1 millimeter thick, and center layers for DVD-14, and DVD-18 discs, which are intended to be approximately 0.25 millimeter thick.

If mold 1 of FIG. 1 is used to make an optical disc, one or both of boosters 11 and 21 may contain digital information in the form of pits, grooves tracks, etc. to be transferred to the disc by the cavity surface. The information (pits, groove tracks, etc) can be added to the booster surface by ion beam etching or by other micro-machining processes. Alternatively, the information can be provided in a very thin coating of another material such as quartz, titanium nitride, or nickel which is applied to the cavity surface of booster 11 or 21. The coating must be sufficiently thick to carry disc pits, or grooves tracks, but not so thick as to significantly influence thermal behavior of the temperature boosters.

It is possible to arrange the temperature control stimuli at different distances from the surfaces on either side of the mold cavity, or the distances can be substantially the same. However, if the molded article is not removed from one side (e.g., the stationary side) in the short time during each cycle when the mold is open, more heat energy is stored in the side with more material between the cavity surface and temperature control stimuli or on the side where the molded article contacts the cavity surface for a substantially longer time period. This imbalance can cause the cavity surfaces of one side of the mold to heat and cool at a different rate than the cavity surfaces of the other side of the mold. Lowering the temperature of control stimuli at the side of greater heat storage relative to the other side can cause the cavity surfaces to heat and cool at substantially the same rate. This and other similar imbalances also can be addressed by employing different booster thicknesses at different areas of the cavity surface.

Because of the low melt viscosity and high pressures required, a mold for making a very thin wall article must have parts that are precisely machined and closely fit to avoid flash. If these precisely machined parts differ too much in temperature, differential thermal expansion may cause the mold parts to bind. Therefore, it is preferable to heat and cool cavity surfaces uniformly, and to adjust their temperatures by making the booster thinner on the side of greater heat storage.

An efficient way to evaluate a booster thickness obtained by the equation and descriptions above is a Finite Element model of one or more slices through the mold, extending from the temperature control stimuli on one side of the mold to the temperature control stimuli on the other side, the slice extending through the cavity and the article being molded. Two or three dimensional finite element models are suggested for configuring fluid passages.

Figure 2:
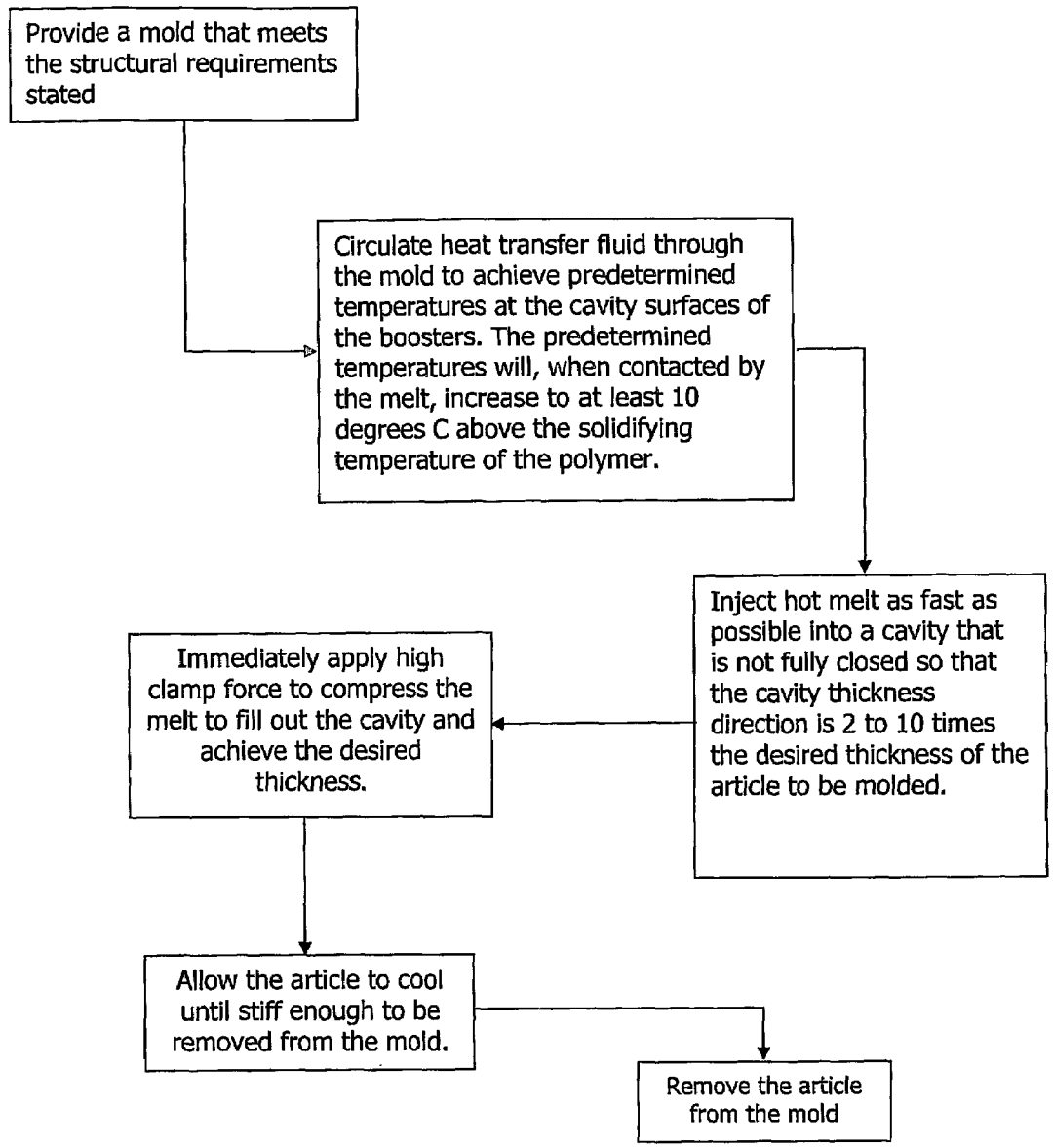
FIG. 2 is a flow chart depicting the molding process.

An inventive molding process utilizing mold 1 of FIG. 1 and diagramed in FIG. 2 comprises a sequence of steps after first defining a part to be made in a mold 1 having dies 12 and 22. A temperature control stimuli is applied to dies 12 and 22, preferably so as to maintain a fixed rate of control energy while the various temperatures around the mold cycle up and down as the mold is charged with hot melt, cooled to set the article, opened and then this cycle is repeated. In the illustrated embodiment the temperature control involves circulating a heat transfer fluid, for example obtaining the fixed temperature control stimulus by maintaining an approximately constant temperature in the heat transfer fluid flowing through fluid passages of the center and edge circuits in dies 12 and 22.

The fluid in the edge circuit can be hotter than the fluid in the center circuit for temperature balancing. Fluid temperatures can be adjusted so that after some succession of many molding cycles, the temperatures obtained at each point in successive cycles are repeated, and the surfaces of the cavity are held at optimal temperatures just prior to contact by the molten material to be introduced into the mold cavity, and thereafter.

An optimum pre-injection cavity surface temperature is a temperature that upon contact by the molten material of a predetermined temperature, increases and remains at and above a temperature required while the mold is filling to ensure the mold is filled without undue obstruction due to material setting or viscosity effects with temperature before the mold is filled. This problem arises particularly when producing a very thin wall molded article. The mold filling temperature of the cavity surface preferably is raised by contact with the melt to at least 10 degrees C. above the solidifying temperature of the melt for very thin wall articles. The pre-injection cavity temperature is below the heat deflection temperature of the plastic.

Because of the low kρc product of the boosters, predetermined pre-injection temperatures are below the heat deflection temperature of the plastic. This normally would not be possible if cavity surface temperatures are to be heated to 10 degrees C. or more above the solidifying temperature using cavity surfaces formed by materials with higher kρc products, such as when the same die is made of common thermally conductive mold materials, namely metals, and does not have any thermally insulating temperature boosters.

In an advantageous embodiment, available injection pressures are presumed to be subject to limitations related to price and equipment considerations. In this embodiment, an injection-compression technique can be used as part of the process of the invention, and is useful for molding very thin wall articles.

The injection-compression technique can involve squeezing low viscosity flowable material from the cavity and/or coining or compressing the material after viscosity has increased somewhat. In either case, the moving-side element 10 and opposed element 20 are relatively positioned so that the cavity opening in the thickness direction, for producing a thin walled article, is 2 to 10 times the desired thickness of the article to be molded. A full shot of hot melt is injected into the cavity while in this expanded state (or alternatively the injection pressure can force the cavity to expand during injection).

Immediately after injection is complete, or preferably slightly before injection is complete, a high clamp force is applied to compress and squeeze the cavity. Insofar as excess material is present due to the preliminary expanded state of the cavity, compression forces the mold parts back together, redistributing and if necessary ejecting excess material through a sprue opening (not shown). The mold parts can be compressed until associated surfaces abut, for example around the perimeter of the cavity. The result is a very thin article of the desired article thickness.

In an exemplary embodiment, a full volume of 390° C. molten polycarbonate required to form a 0.1 mm thick disc can be injected into a 0.6 thick cavity opening in 0.007 second. Immediately, a clamp force of 30 metric tons is applied for approximately 0.065 second. The cavity is completely filled and the desired 0.1 thickness achieved using the mold of the invention.

If an all metal mold is used comparably, and kept under uniform temperature control so as to cycle, portions of the melt would solidify before the cavity could be completely filled by flow of the molten material. It is likewise not possible and has not been suggested in the prior art to use resistive heat or insulating layers to heat the cavity more substantially in order to mold very thin wall articles, and it is believed that thermal expansion differences would not allow the respective materials to withstand the rapid temperature cycling. Also, as stated above, surface layers in molds lined by materials that are less durable and/or matched would be susceptible to damage by the occasion process malfunctions where a sprue or disc is crushed in the mold.

Supplemental or primary resistive heating could be used to adjust certain temperature levels during mold cycling. However such heating provisions add to the cost and complexity of temperature cycling circuits and controls. U.S. Pat. No. 6,290,882 teaches circulating heating fluid through the mold to bring the cavity surface above the glass transition temperature to fill the mold. Then, after the mold is filled, to circulate cooling fluid to cool the cavity surfaces and solidify the part. This process adds equipment, controls and complexity and although the supplemental heating permits operation at high temperatures, the mold necessarily cycles more slowly due to thermal inertia than the invention as described herein, wherein temperature boosters are used in connection with continuous heating stimuli.

After the cavity is full, heat flows through the boosters to the cooler dies. This reduces the temperature of the booster cavity surfaces from at or above the mold filling temperatures towards the pre-injection cavity surface temperature that can be the control point for the thermal control stimulus. As shown in the further embodiments such as FIG. 4, to optimize cooling time, booster cavity surface temperatures may be prevented from local overheating by varying booster thickness to allow heat to flow from the booster to the die at portions of the mold prone to overheating even while the mold is filling.

The invention is applicable if the mold cavity temperature remains elevated until slightly before the material completely fills the cavity or slightly after, or similarly until after a required hold period has elapsed, in each case achieving advantages over known molding process operated in a comparable manner.

U.S. Pat. Nos. 4,340,551, 4,338,068 and 3,619,449 employ complicated and expensive equipment to add heat and remove heat. This causes the cavity surface temperature to cycle, that is to increase for mold filling and to decrease after the mold is full. This technique is useful but complex. The present invention causes the cavity surfaces to cycle from below the heat deflection temperature to the higher temperatures required to fill a mold for a very thin wall article without first adding and then removing heat at the dies and without moving parts and complex controls.

Figure 3:
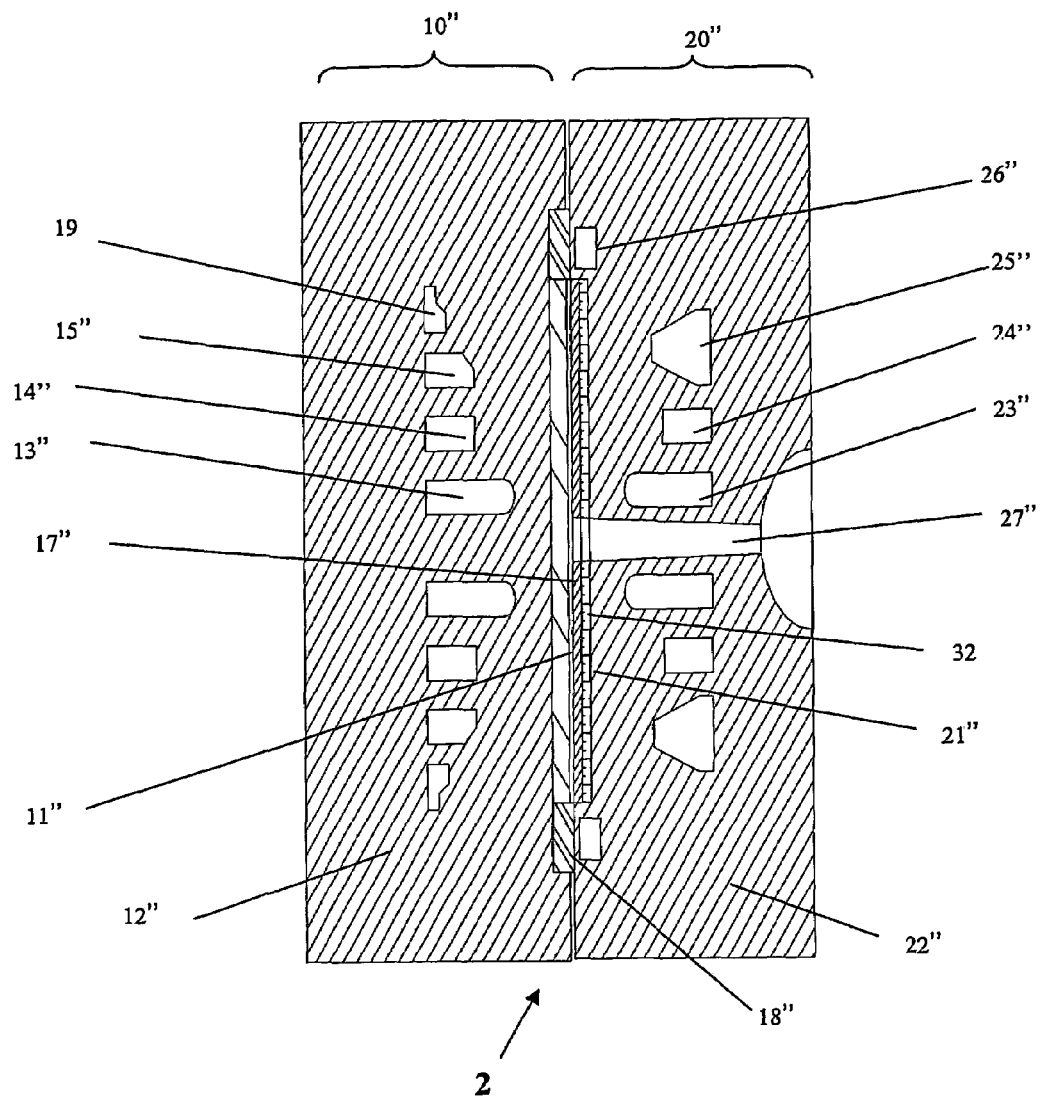
FIG. 3 is a cross-section of a mold according to a second embodiment of the invention.

FIG. 3 shows a simplified cross-section of a mold 2, in a second embodiment that is useful for molding optical discs. A moving-side element 10", moving-side temperature boosters 11", and moving-side die 12". The purposes, requirements, and suitable materials for boosters 11" are the same as those for boosters 11 of FIG. 1, mold 1. Although not shown in FIG. 3, booster thicknesses can be different at different locations to promote more uniform cooling.

Moving-side die 12" provides structural support to boosters 11". The functions, and requirements for die 12" and fluid passages 23", 24", 25", and 26" are the same as those for die 12 and passages 13", 14", 15", and 16" of mold 1 of FIG. 1. Fluid passage 19 is part of the center fluid circuit. Other thermal means for temperature control stimuli for the die may be used.

FIG. 3 also shows a stationary-side element 20". Element 20" comprises a stamper 32, stationary-side temperature boosters 21", and stationary-side die 22". Stamper 32 defines at least a part of the surfaces of a cavity 17". The purpose of stamper 32 is to provide a surface that contains the digital information in the form of pits, grooves or tracks that will be transferred to the surface of an optical disc when it is molded. Although shown on the stationary-side of the mold, it may be employed on the moving-side or on both sides of the mold, which would be beneficial for manufacture of DVD-14, and DVD-18 center discs.

The stamper is made of material that has the required durability at the temperatures and pressures at which it must operate. Suitable materials can be selected from the group consisting of metals, glasses, and ceramics. A thin nickel layer 0.010 to 0.013 inch thick is typically used for the stamper, but the thickness may be 0.005 to 0.025 inch. A stamper whose mathematical product of thermal conductivity, density, and specific heat is greater than those of boosters 21" increases the demands on boosters 21", because the boosters must restrict heat flow from the stamper to cause some of the heat from the molten material to build up within the stamper to raise its temperature and thereby the cavity surface temperatures. More heat is required to raise the temperature of the stamper when the thickness and mathematical product of density and specific heat of the stamper are greater. The inventors have also discovered that the greater the thickness and product of density and specific heat of the stamper, the more time it takes to raise the cavity surface temperature from the predetermined temperature to the temperature required during mold filling. Although the time is short, it is significant compared to the increase in temperature provided by boosters, which may require higher predetermined temperatures, or a layer thermally similar to the stamper on the opposite cavity face, or boosters with lower $k\rho c$ products on the stamper side to compensate. Metal stampers draw so much heat from the melt that they may not be successfully used for discs less than 0.2 mm thick. However, the performance penalties of a metal stamper are often overcome by two of its benefits compared to boosters: (1) the technology for incorporating digital information into part of the cavity surface of a metal stamper is in common use, and (2) the large investment in stamper making equipment has already been made by stamper manufacturers.

Boosters 21" can be made of the same or different materials as boosters 11", and have the same requirements. The boosters can be installed in any of the ways already described for moving-side element 12". A stationary-side die 22" supports boosters 21" and stamper 32 in the same way moving-side die 12" supports boosters 11" and has the same requirements. Boosters can be located behind only part of the stamper. To more closely match the temperature history curve of the cavity surface on the opposite sides, the thickness of the booster on the moving-side can be increased. Except for the stamper, the mold can be made using the same process as used for mold 1 of FIG. 1.

An entrance 27" provides a way for molten material to enter mold cavity 17". Other means for bringing molten material into the mold cavity may be used. The process for operating mold 2 of FIG. 3 is as described with respect to FIG. 1 in that the temperature control and moving-side mold part are arranged in the same way as described for the operation of mold 1 of FIG. 1. For the stationary-side, molten material being introduced into cavity 10" through entrance 27" comes into contact with stamper 32 where heat flowing from the molten material to said stamper causes temperatures of cavity surfaces formed by the stamper to increase. Cavity surfaces reach temperatures determined by the products of thermal conductivity, density and specific heat of the molten material, and of the materials used for the stampers, and by the temperatures of each just before they contact. The cavity surfaces remain at these temperatures as though boosters 21'" do not exist until heat starts flowing through the stamper into the boosters. Higher thermal diffusivities, and thinner stamper 32, reduce the time until heat flows through the stamper into the boosters. When heat does flow into boosters 11'" the thermal conductivities, densities, and specific heats of the booster ($k\rho c$ product) act cooperatively to restrict the heat flow from the adjacent stamper 32. This causes the heat flowing from the molten material to build up within stamper 32 such that temperatures of cavity surfaces of the stamper increase to or above the temperatures required to fill the mold and to produce a very thin wall molded article.

When molding a very thin wall optical disc, such as under 0.2 millimeters thick, using a metal stamper, the heat available from the molten thermoplastic may not be enough to elevate the cavity surface temperature sufficiently to completely fill the mold. In this situation, either the stamper material can be changed to a glass or ceramic material, or an arrangement like mold 1 of FIG. 1 is used to provide the pits or groove tracks in the surface of the booster. Polycarbonate is the current material of choice of optical disc manufacturers. However, other materials may be molded into optical disc by the invention.

Figure 4:
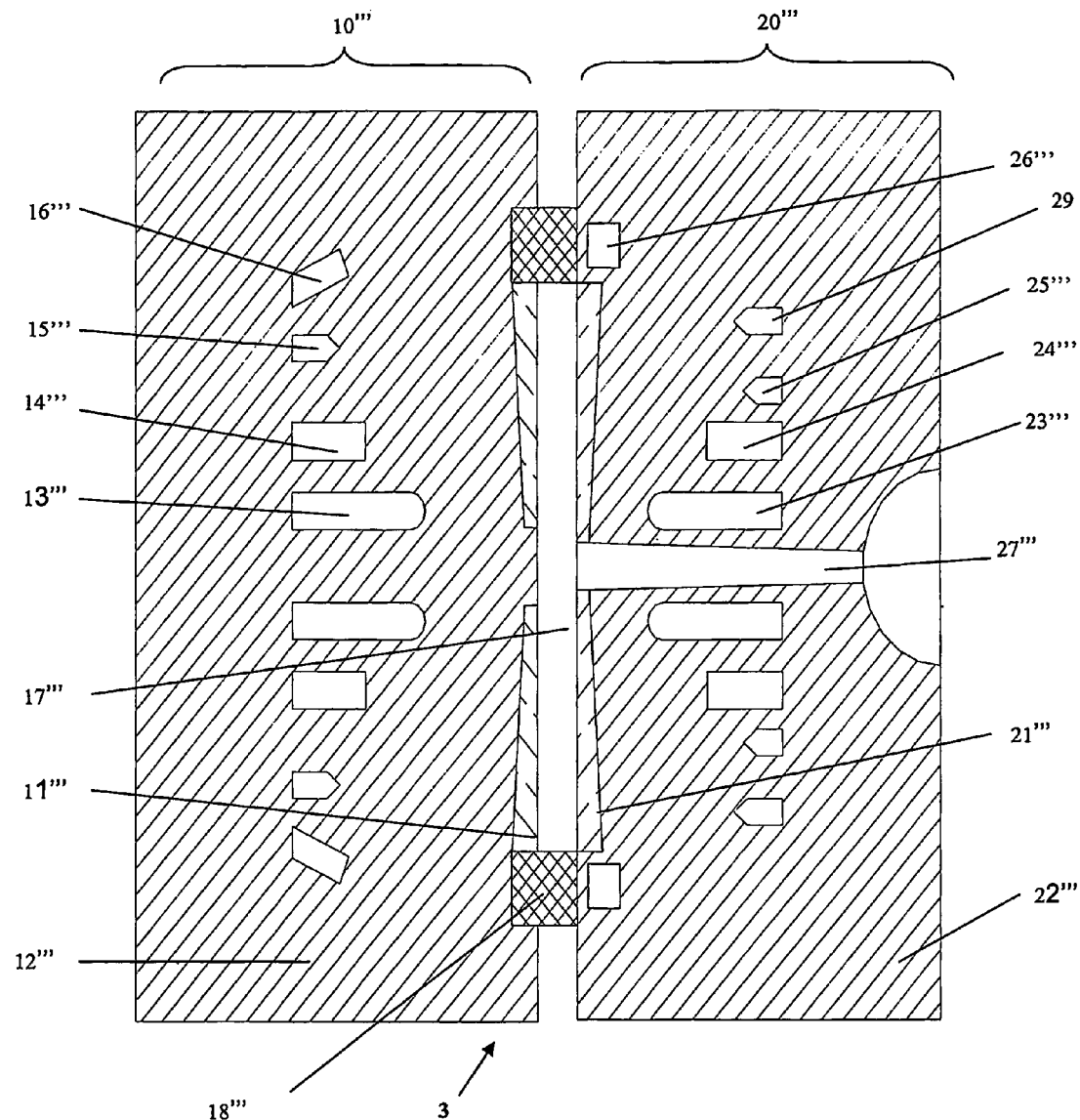
FIG. 4 is a cross-section of a mold according to a third embodiment of the invention.

FIG. 4 shows a simplified cross-section of mold 3, a third embodiment that is useful for molding an optical disc article. Element 10'" and 20'" of mold 3 have boosters 11'" and 21'" that define at least a part of the surfaces of cavity 17'". Booster materials manufacturing and assembly requirements were identified under the description for mold 1 of FIG. 1. Boosters 11'" and 21'" are shown thicker towards the cavity outer edges to illustrate a design that helps overcome the greater heat loss and reduced melt contact time at the outer edge and is suitable for molding an optical disc. For example, a mold for manufacturing a 0.1 millimeter thick optical disc surface layer may have a booster that is 1.0 millimeter thick at its inside diameter and 3.0 millimeter thick at its outside diameter to keep the inner portion from overheating and unnecessarily extending the cooling period and molding cycle times. Generally, the thickness may be uniform or thinned or thickened at various locations to tailor heat flow for a specific molded article.

Dies 12'" and 22'" provide structural support to boosters 11'" and 21'". The purposes and requirements for dies 12'" and 22'" and the fluid passages are the same as those for dies 12 and 22 and the passages of mold 1 of FIG. 1.

Finite element transient thermal and structural analysis can be used for developing specific structural design, molding event times, and fluid passages for a specific embodiment of the invention. The process for operating mold 3 of FIG. 4 is much the same as for mold 1 of FIG. 1, and is outlined in FIG. 2.

Figure 5:
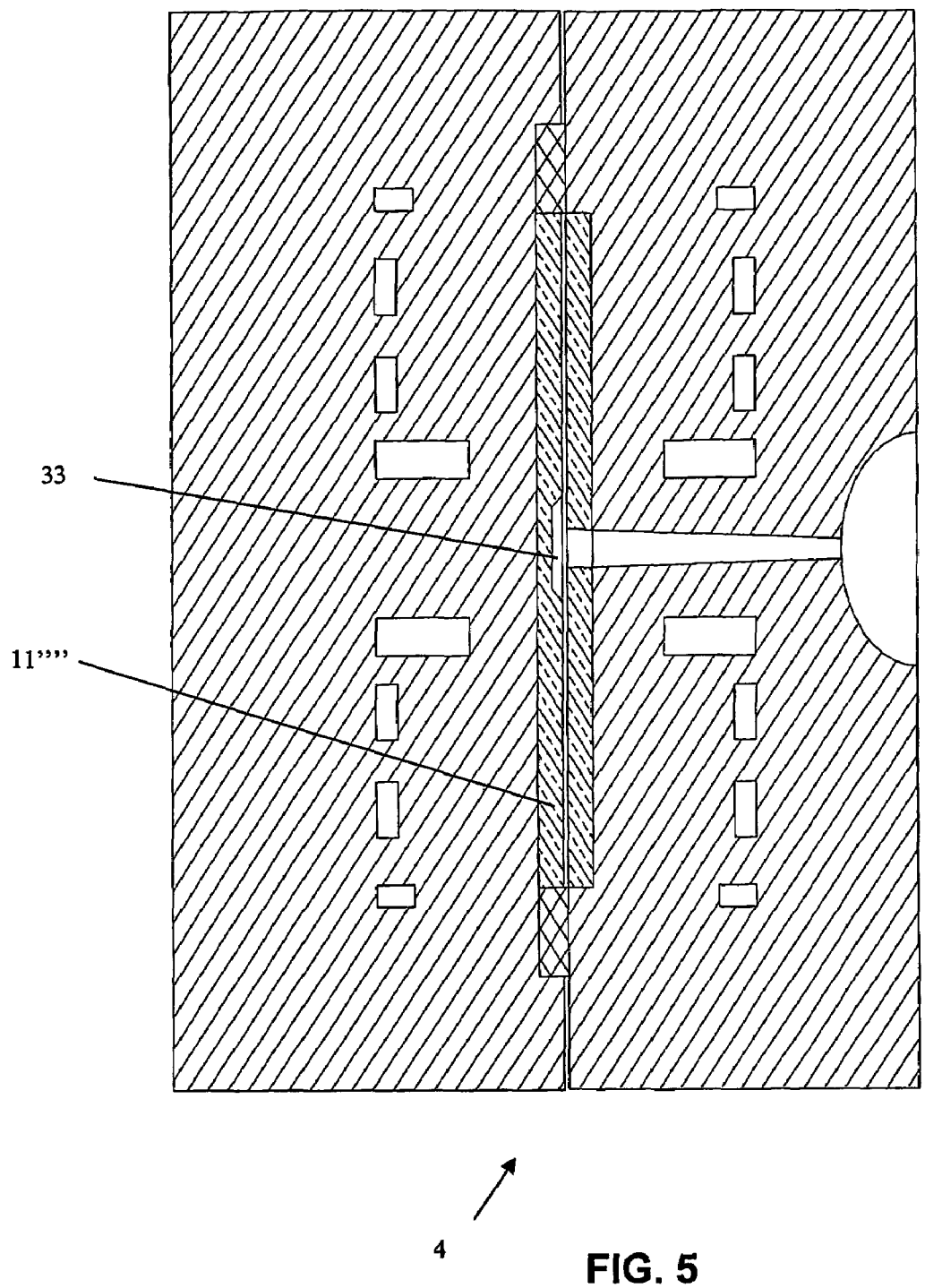
FIG. 5 is a cross-section of a mold according to an embodiment of the invention for molding a very thin wall optical disc with a thickened center portion.

FIG. 5 shows a simplified cross-section of mold 4, an embodiment of the invention for molding a very thin wall optical disc with a recess 33 in booster 11'''' to provide a larger opening in the center portion of the cavity; which allows easier entry of the molten material into the cavity. For coining, a technique widely used for optical disc molding, the material entering the cavity is under an injection pressure that overcomes low initial clamping force thereby separating the mold haves and increasing the thickness of the flow path for the molten material. With the larger opening provided by recess 33 at the center portion of the cavity, the mold halves can be separated by lower injection pressure. After or shortly before the cavity is filled, mold clamping force in rapidly increased pressing the mold halves together, which spreads the molten material to completely fill the mold and form the optical disc. The boosters elevate the cavity surface temperatures sufficiently for the viscosity of the molten material to remain low enough to completely fill the cavity.

If a thicker center hub on the disc article is not desired, the recess 33 can be formed by partially retracting this portion of the cavity surface while the cavity fills; and after it is completely filled advancing it to eliminate recess 33.

The invention has been described in connection with preferred embodiments. Such preferred embodiments are not intended to limit the scope of the invention to the particular forms set forth, but on the contrary, it is intended to cover such alternatives, modifications, and equivalents as may be included within the spirit and scope of the invention as defined by the appended claims.

What is claimed is:

1. A process for optimizing a molding temperature during flow of molten molding material into a mold cavity, the molding material to flow while molten in the mold cavity from at least one point of injection, along a flow path having a width defined by cavity walls, and the molten material transferring heat energy to the mold cavity for cooling and setting the molten material in a shape determined by the mold cavity, said transferring of heat energy being determined by temperatures and thermal properties of the molten material and the mold cavity, the process comprising the steps of:
    providing a mold cavity controllable to a predetermined pre-injection temperature that is lower than a temperature at which the molding material sets, wherein the mold cavity can be heated temporarily by injection of the molten molding material at an injection temperature that is higher then said temperature at which the molding material sets and said material thereafter cools by transfer of heat energy into the cavity, to a post-injection temperature cool enough to harden the molding material;
    determining a material flow path in the mold cavity between a point of injection of the molten molding material and a remote part of the mold cavity to be filled with the molten material by flow from the point of injection;
    predetermining the pre-injection temperature of the cavity and the injection temperature of the molten material, and mathematically determining a thickness of a thermal insulation temperature booster at least along a part of the mold cavity along the flow path, such that a temperature of the molding material is elevated to an extent that the molding material remains at a temperature higher than the temperature at which the molding material sets, until the molding material has filled the mold cavity to form a molded article;
    cycling the molding cavity while applying a substantially constant temperature control stimulus to the mold cavity, said cycling comprising successively and repeatedly bringing the mold cavity to a predetermined pre-injection temperature below a setting temperature of the molding material; injecting the molten molding material so as to elevate a temperature of the mold cavity at the temperature boosters to a temperature at least 10 degrees C. above setting temperature of the molding material; and completely filling the mold before a flowpath in the cavity is occluded by progress of setting of the molding material in the cavity.

2. The process of claim 1, wherein the thermal insulation temperature booster has a thickness substantially determined by the relationship:

$$(T-T_s)/(Tm-T_s)=erfc(X);$$

$$X=Z/(2*(\alpha*t)^{(1/2)});$$

Where: T−Ts is an amount of temperature increase to allow at a die side of the booster and is in a range of 0.1 to 5 degrees C.;
    $T_s$ is a temperature at a cavity surface side of the booster before contact by hot melt;
    Tm is a desired cavity surface temperature during filling and is in a range of solidifying temperature plus 10 degrees C. to 100 degrees C.; and,
    α is a thermal diffusivity of a booster layer material;
    t is a time to fill the cavity;
    Z is the thickness of the booster layer; and,
    erfc is a complementary error function.

3. The process of claim 2, wherein the booster material is characterized by a mathematical product of thermal conductivity, density and specific heat of no more than $2.0\times10^{-6}$ $BTU^2/sec/in^4/°F^2$ at room temperature.

4. The process of claim 2, wherein the booster material comprises zirconia.

5. The process of claim 2, wherein $T-T_s$ is substantially 0.1 degrees C.

6. The process of claim 1, further comprising defining the mold cavity between relatively movable clamped-together mold parts, and permitting the mold parts to become displaced during injection of the molten molding material sufficiently that the mold cavity is temporarily enlarged to a cross sectional dimension of two to ten times a desired thickness of an article to be molded in the mold cavity.

7. The process of claim 6, further comprising applying a varying clamping force to the clamped-together mold parts, the clamping force being greater with completion of filling, thereby obtain the desired thickness of the article.

8. The process of claim 1, further comprising maintaining a thickness of the molded article by at least one of shaping the mold cavity to have a variation in thickness, compression of the mold cavity against injection pressure and coining compression of the molded article during setting.

* * * * *